(12) United States Patent
Morrison et al.

(10) Patent No.: US 6,234,244 B1
(45) Date of Patent: May 22, 2001

(54) NON-INTRUSIVE COOLING SYSTEM

(75) Inventors: Edward F. Morrison, Burnt Hills, NY (US); John W. Bergman, Barrington, NH (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/259,309

(22) Filed: Mar. 1, 1999

(51) Int. Cl.⁷ ...................................................... F28D 7/10
(52) U.S. Cl. ............................ 165/154; 165/46; 138/112; 62/62
(58) Field of Search ........................... 165/154; 137/340; 62/62, 99, 134; 138/38, 112

(56) References Cited

U.S. PATENT DOCUMENTS

| | | | |
|---|---|---|---|
| 2,551,710 | * 9/1951 | Slaughter | 137/340 |
| 3,650,322 | * 3/1972 | De Munnik | 165/154 |
| 3,801,285 | * 4/1974 | Meisenburg et al. | 62/99 |
| 4,753,220 | * 6/1988 | Lutzen et al. | 126/355 |
| 4,811,568 | * 3/1989 | Horan et al. | 62/200 |
| 4,915,121 | * 4/1990 | Rains | 138/112 |
| 4,945,978 | * 8/1990 | Herrmann | 165/47 |
| 4,954,321 | * 9/1990 | Jensen | 422/186.19 |
| 5,076,999 | 12/1991 | Forsberg . | |
| 5,131,232 | * 7/1992 | Uno et al. | 62/62 |
| 5,178,821 | 1/1993 | Gluntz . | |
| 5,186,502 | * 2/1993 | Martin | 138/112 |
| 5,213,755 | 5/1993 | Kelly et al. . | |
| 5,267,281 | 11/1993 | Gillett et al. . | |
| 5,268,942 | 12/1993 | Newton et al. . | |
| 5,303,274 | 4/1994 | Sawyer . | |
| 5,375,654 | * 12/1994 | Hougland et al. | 138/38 |
| 5,398,267 | 3/1995 | Reinsch . | |
| 5,478,442 | * 12/1995 | Orac | 201/117 |
| 5,786,054 | * 7/1998 | Platusich et al. | 138/112 |
| 5,798,587 | * 8/1998 | Lee | 310/58 |
| 5,857,838 | * 1/1999 | Wagner, Jr. | 417/173 |
| 5,906,236 | * 5/1999 | Adams et al. | 165/46 |

* cited by examiner

*Primary Examiner*—Ira S. Lazarus
*Assistant Examiner*—Terrell McKinnon
(74) *Attorney, Agent, or Firm*—Virginia B. Caress; Paul A. Gottlieb

(57) ABSTRACT

A readily replaceable heat exchange cooling jacket for applying fluid to a system conduit pipe. The cooling jacket comprises at least two members, separable into upper and lower portions. A chamber is formed between the conduit pipe and cooling jacket once the members are positioned about the pipe. The upper portion includes a fluid spray means positioned above the pipe and the bottom portion includes a fluid removal means.

The heat exchange cooling jacket is adaptable with a drain tank, a heat exchanger, a pump and other standard equipment to provide a system for removing heat from a pipe. A method to remove heat from a pipe, includes the steps of enclosing a portion of the pipe with a jacket to form a chamber between an outside surface of the pipe and the cooling jacket; spraying cooling fluid at low pressure from an upper portion of the cooling jacket, allowing the fluid to flow downwardly by gravity along the surface of the pipe toward a bottom portion of the chamber; and removing the fluid at the bottom portion of the chamber.

22 Claims, 6 Drawing Sheets

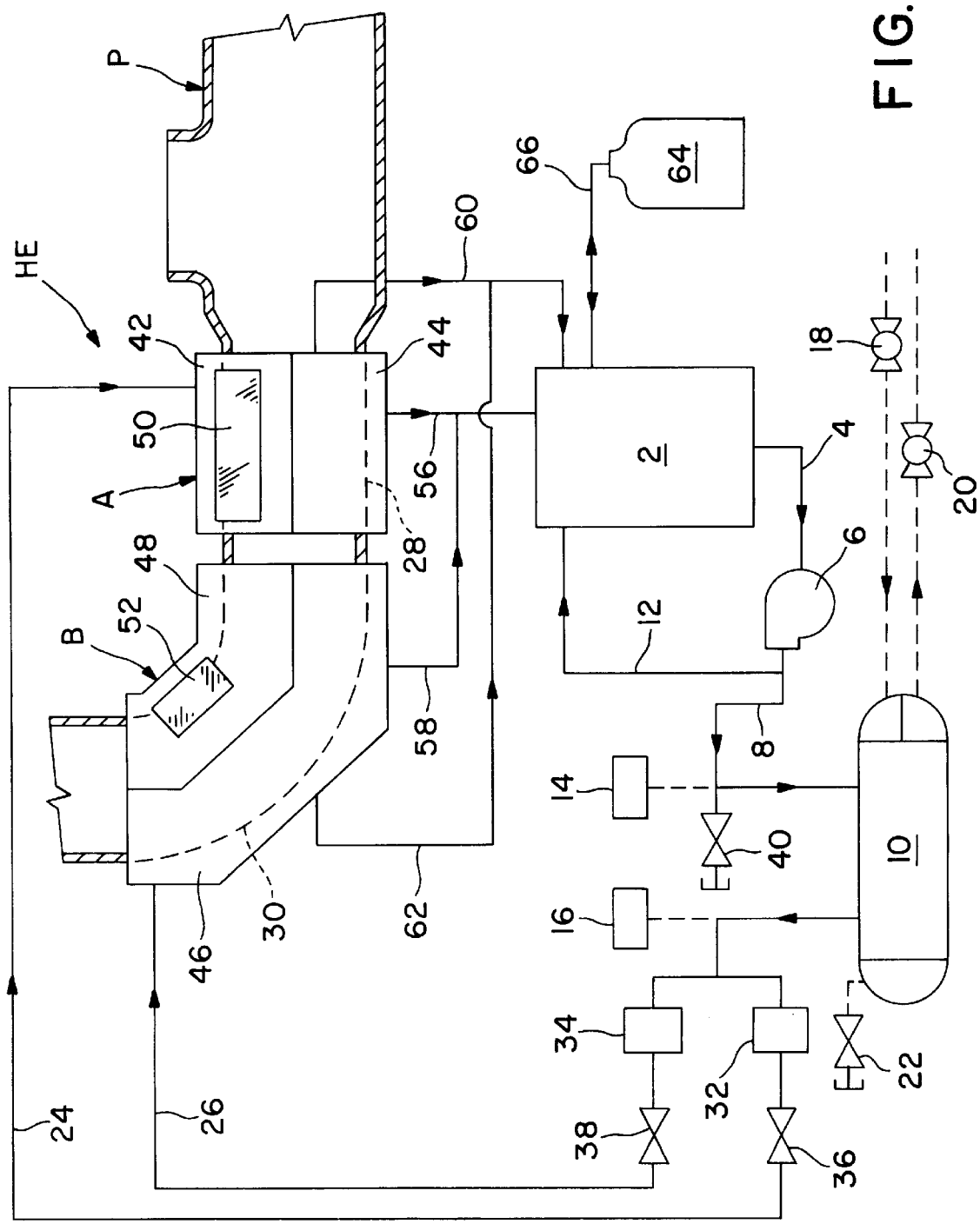
FIG. IC

NON-INTRUSIVE COOLING SYSTEM

FIELD OF THE INVENTION

This invention was made under contract with the U.S. Department of Energy. The present invention relates to a non-intrusive heat exchange cooling system used primarily, but not limited to, removing residual (decay) heat from a nuclear power plant heat source during maintenance situations, by external cooling of adjunct piping.

BACKGROUND OF THE INVENTION

Power generating stations produce tremendous amounts of thermal energy. These stations generally use cooling systems to reduce or eliminate thermal heat, thereby keeping the plant at a suitable temperature during accidents and normal plant operation. However, these normal cooling methods are unavailable to remove residual (decay) heat during plant maintenance periods. Therefore, there is a need for a system to sufficiently cool the system to allow maintenance personnel to access and fix piping, wiring and instrumentation problems.

The current method for heat removal is to directly cut into and interface with the system loop piping so that a separate temporary system can be attached to circulate the internal fluid between the heat source and a heat exchanger. Referring to FIG. 1A, incisions G are made in the system piping C and temporary piping D is installed. A specially designed pump E and heat exchanger F are attached to the temporary piping. The pump E and heat exchanger F are specially designed (e.g., canned parts) to accommodate the flow of radioactive coolant. The normal flow path through the heat source (core) is used to cool the heat source. However, direct interface with system loop piping is particularly undesirable in Duclear power plant systems because 1) the work is time consuming resulting in excessive human exposure to higher radiation levels, and 2) the difficulty associated with containing radioactive fluid. Therefore, a non-intrusive method, which removes heat from nuclear power plant systems without cutting into the system piping, is desired. There is no way to directly cool the pressure vessel containing the nuclear fuel constituting the heat source. The system needs to utilize a heat exchanger located on the adjunct piping system which will cool the heat source. The system must rely on natural circulation of the internal fluid to transfer heat from the source to the heat exchanger.

Several types of non-intrusive heat exchangers currently exist which could be attached to the pipe, and these were considered for this application. One method uses commercially available clamp-on heat exchanger cooling jackets. The cooling jackets consist of two sheetmetal plates spaced to create an air gap between and to create an air gap around the system pipe curvature. The plates are edge-sealed and are spot welded together with a weld pattern that produces a dimpled or embossed surface on the outer plate. This raised embossment array provides for homogenous mixing of the coolant, as it passes through the cooling jacket. Couplant is applied to the pipe surface, prior to installing the cooling jackets, to transfer cold temperature from the cooling jacket to the pipe. However, this process is messy and the amount of heat extracted is inadequate.

Another method uses clamshell type covers. These covers are configured to provide a sufficient gap between the inside surface of the shell and the exterior surface of the pipe. The covers are then axially and circumferentially sealed when installed onto the pipe, but had a major disadvantage in requiring the shell to become flooded and necessitating pressure-tight seals between the pipe and exterior shells.

Therefore, there is a need to remove heat from nuclear power plant system piping in a non-intrusive manner while avoiding the disadvantages of the prior art. This invention would provide non-intrusive heat removal that is clean, provides adequate heat removal and uses commercially available parts.

OBJECT AND SUMMARY OF THE INVENTION

It is an object of the invention to provide an environmentally safe way to remove heat generated by radioactivity.

It is another object of the invention to provide maximum heat removal without actually cutting system piping.

It is still another object of the invention to provide maximum heat transfer in a clean, non-intrusive manner.

It is yet another object of the invention to provide a cooling jacket adaptable with standard available equipment.

It is an object of the invention to provide heat transfer with lower operating costs and minimal involvement from plant personnel.

It is another object of the invention to provide a system adaptable for cooling.

It is still another object of the invention to provide increased heat transfer capacity over other non-intrusive heat exchangers.

It is yet another object of the invention to provide a heat removal system that eliminates disadvantages of prior art.

It is a further object of the invention to provide a non-intrusive heat transfer system that is lightweight, and quickly assembled to minimize radiation exposure during installation.

In summary, the present invention is directed toward a system which can remove residual heat from a nuclear power plant by utilizing a readily replaceable heat exchanger jacket at a remote piping location. The cooling jacket is located to promote natural circulation of the fluid inside the pipe so that heat is transferred from the heat source to the cooling jacket. The cooling jacket comprises at least two members, separable into upper and lower portions, such that a chamber is formed between the conduit pipe and cooling jacket once the members are positioned about the pipe. The upper portion includes a fluid spray means positioned above the pipe, while the bottom portion includes a fluid removal means.

The heat exchange cooling jacket is adaptable with standard equipment to provide a system for removing heat from a pipe. This heat removing system includes the aforementioned cooling jacket, a drain tank for receiving the fluid from the cooling jacket, a heat exchanger for cooling the fluid or coolant and a pump for suctioning the fluid from the drain tank.

A method is also provided enclosing a portion of the pipe with a jacket to form a chamber between an outside surface of the pipe and the cooling jacket; spraying cooling fluid at low pressure from an upper portion of the cooling jacket, allowing the fluid to flow downwardly by gravity along the surface of the pipe toward a bottom portion of the chamber; and removing the fluid at the bottom portion of the chamber.

BRIEF DESCRIPTION OF THE DRAWINGS

FIG. 1C is a flow diagram, schematically showing the operation of the heat exchange cooling jacket with system piping and standard components.

DESCRIPTION OF INVENTION

Figure 1A:
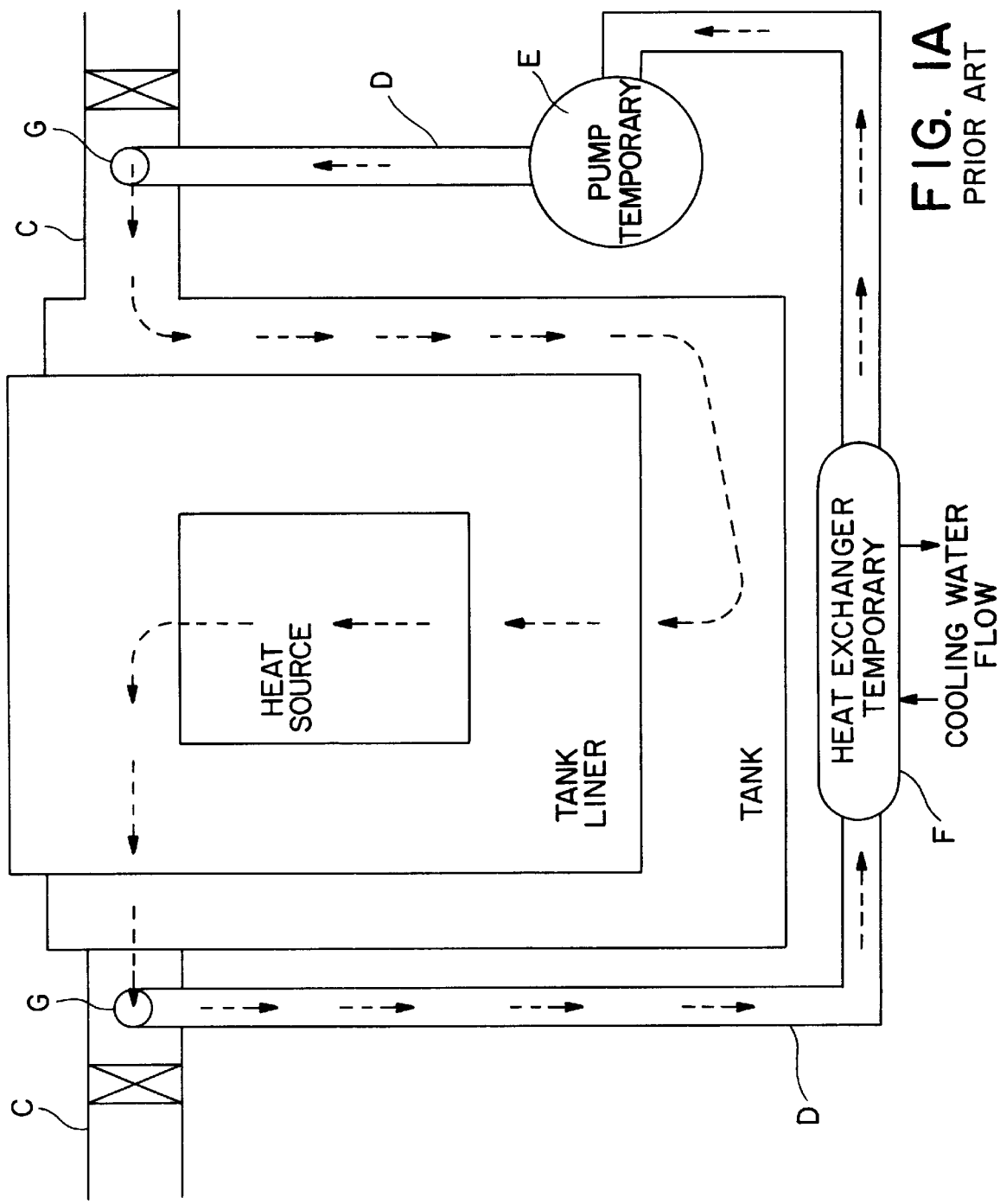
FIG. 1A illustrates the cooling water path in the prior art (i.e., cutting system loop piping).
Figure 1B:
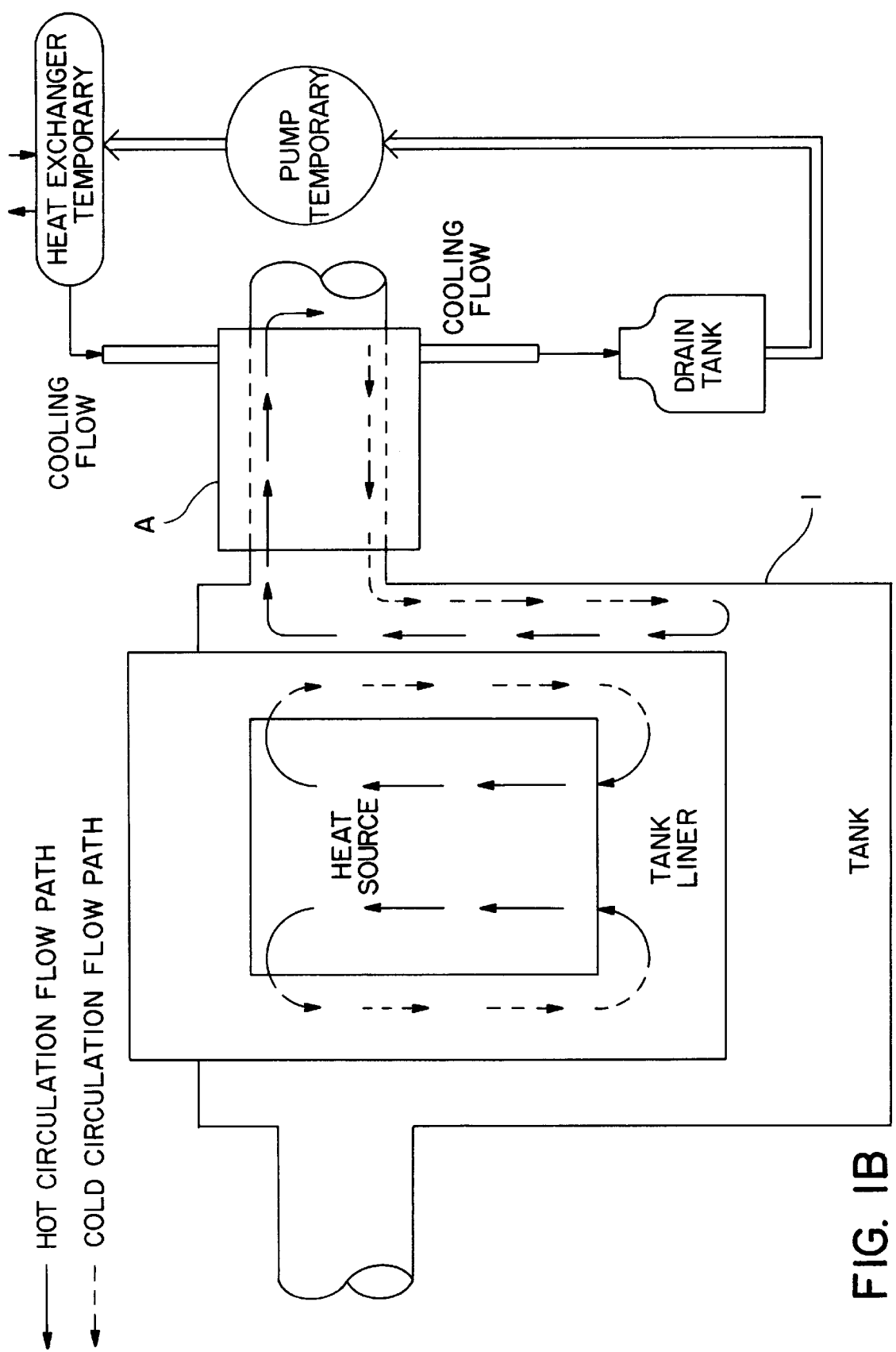
FIG. 1B is a flow diagram schematically showing the convection flow patterns which enable the heat to be transferred from the source to the cooling jacket on the piping adjunct to the pressure vessel containing the nuclear fuel.

FIGS. 1B and 1C

FIG. 1B illustrates the present invention of using a heat exchange cooling jacket A and/or B (see FIG. 1C) on a horizontal section of the system piping to remove heat from a remote source. The nuclear reactor decay heat is transferred from the source to an outer annulus region 1 by a combination of conduction and convection currents. Then convection currents within the system piping provide a method of transferring the heat to the cooling jacket. Hot water from the annulus region 1 enters the adjacent horizontal pipe, flow along the top of the pipe, and is cooled by the heat exchanger jacket. Cooler water flows along the bottom of the pipe back to the annulus region. No incisions are made in the piping. The pump and heat exchanger do not have to be specially designed because they are not exposed to any radioactive coolant. Utilizing convection currents within a horizontal pipe to remove the nuclear reactor decay heat is unique to this invention.

FIG. 1C illustrates a flow diagram showing a system HE for using heat transfer cooling jackets A and B on a conduit pipe or system piping P. Typically, system HE is used during nuclear power plant maintenance. Use of cooling jackets A and B provides the advantage of non-intrusive heat removal without actually cutting into system piping P. This feature minimizes human radiation exposure, maintains pipe structure integrity, minimizes the potential for spill of radioactive liquid and provides adequate heat removal.

Coolant (not shown) is distributed throughout system HE to cool system piping P and thereafter recirculated for re-cooling. The normal coolant is water, although other fluids are possible. Direction of fluid flow is indicated with arrows.

Coolant (not shown) is initially stored in a drain tank 2. The coolant is suctioned through hose 4 into recirculation pump 6, which is used to control coolant flow for system HE. Normal flow is directed through hose 8 to heat exchanger 10. Alternatively, the flow is directed back to drain tank 2 through hose 12. Coolant temperatures at the heat exchanger 10 inlet and outlet are measured with respective thermocouples 14 and 16.

The heat exchanger 10 cools the coolant for system HE. The resultant heat from the coolant is transferred into a separate loop indicated with dashes. Fluid from this other loop travels through valve 18, acquires heat from heat exchanger 10 and returns through valve 20. Valves 18, 20 and 22 are also used to isolate the heat exchanger 10 from the other loop.

The coolant is then directed from heat exchanger 10 through hoses 24 and 26 to respective cooling jackets A and B. Cooling jacket A is used for the straight portion 28 of system piping P, while cooling jacket B is used for the elbow shaped portion 30 of system piping P. Flowmeter 32 measures coolant flow to cooling jacket A, while flowmeter 34 measures coolant flow to cooling jacket B. Valves 36, 38 and 40 are used to either control flow or isolate the heat exchanger 10 from system HE.

Figure 5:
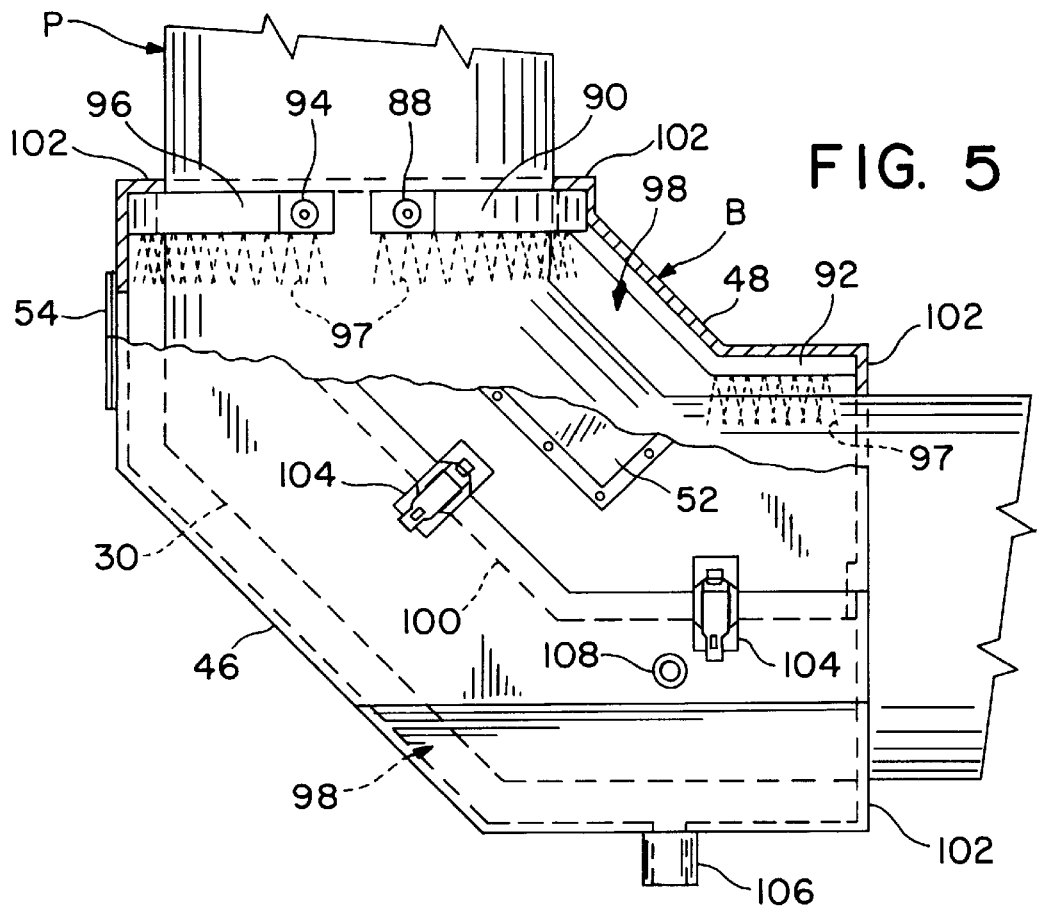
FIG. 5 is a fragmented side elevational view of the elbow-pipe embodiment of the heat exchange cooling jacket with portions shown in cross-section and in phantom lines.

The coolant enters cooling jacket A at the upper member 42, wherein the coolant is sprayed onto the straight portion 28 (shown in phantom) of system piping P. After descending gravitationally around the pipe, the coolant flows into the lower member 44, which acts as a sump. Similarly, the coolant enters cooling jacket B at lower member 46 and at upper member 48. In this embodiment, the coolant descends around the elbow portion 30 (shown in phantom) of system piping P into the lower member 46. Cooling jacket A has a window 50, while cooling jacket B has windows 52 and 54 (FIG. 5).

The discharged coolant from cooling jackets A and B flows back to the drain tank 2 through drain hoses 56 and 58 respectively. Excess coolant from cooling jackets A and B flows through overflow hoses 60 and 62 respectively. Excess coolant from drain tank 2 is directed to an overflow tank 64 through hose 66.

Other applications for system HE are available. It is contemplated that system HE can also be used to provide heat. System HE can also be configured as an open-loop system. The system is useful for various size and capacities of system piping P, pump 6 and heat exchanger 10.

Figure 2:
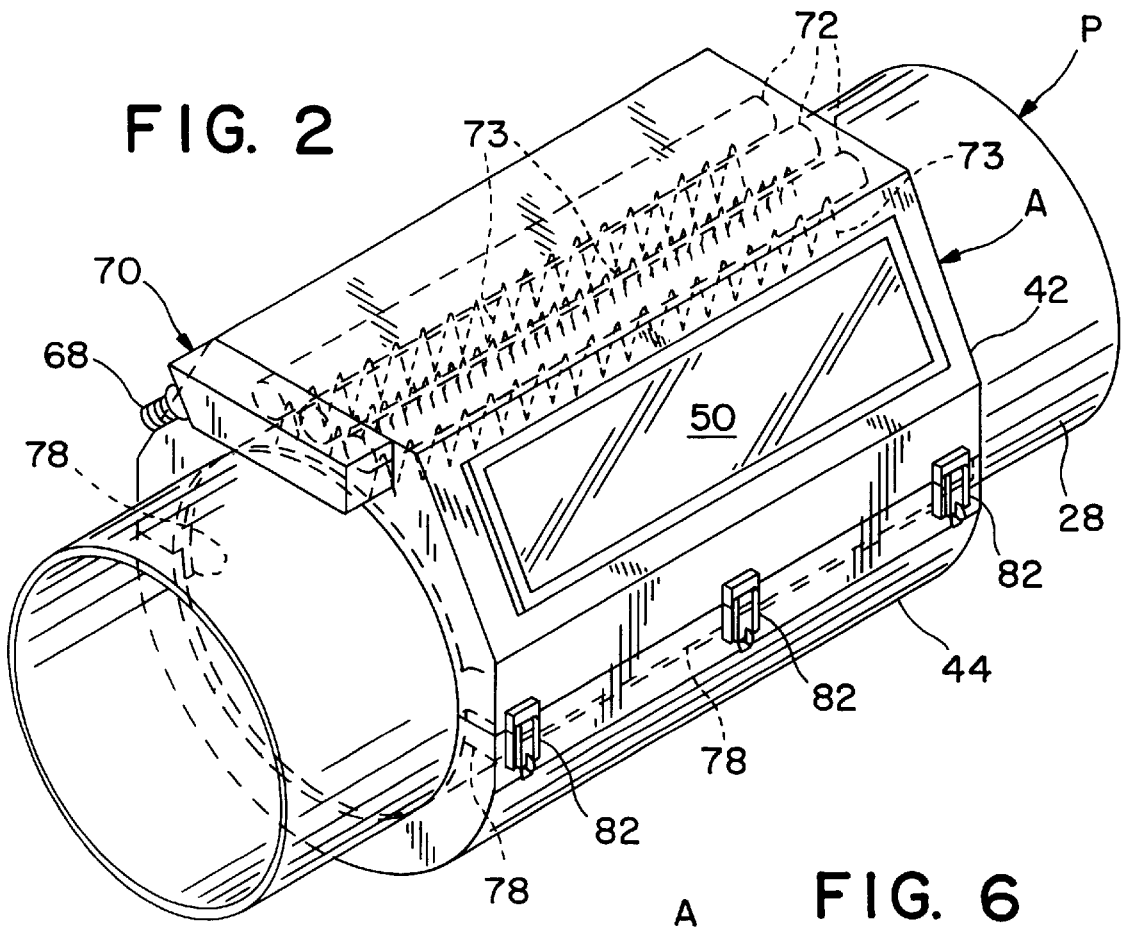
FIG. 2 is a perspective view of the straight-pipe embodiment of the heat exchange cooling jacket with portions shown in phantom lines.
Figure 6:
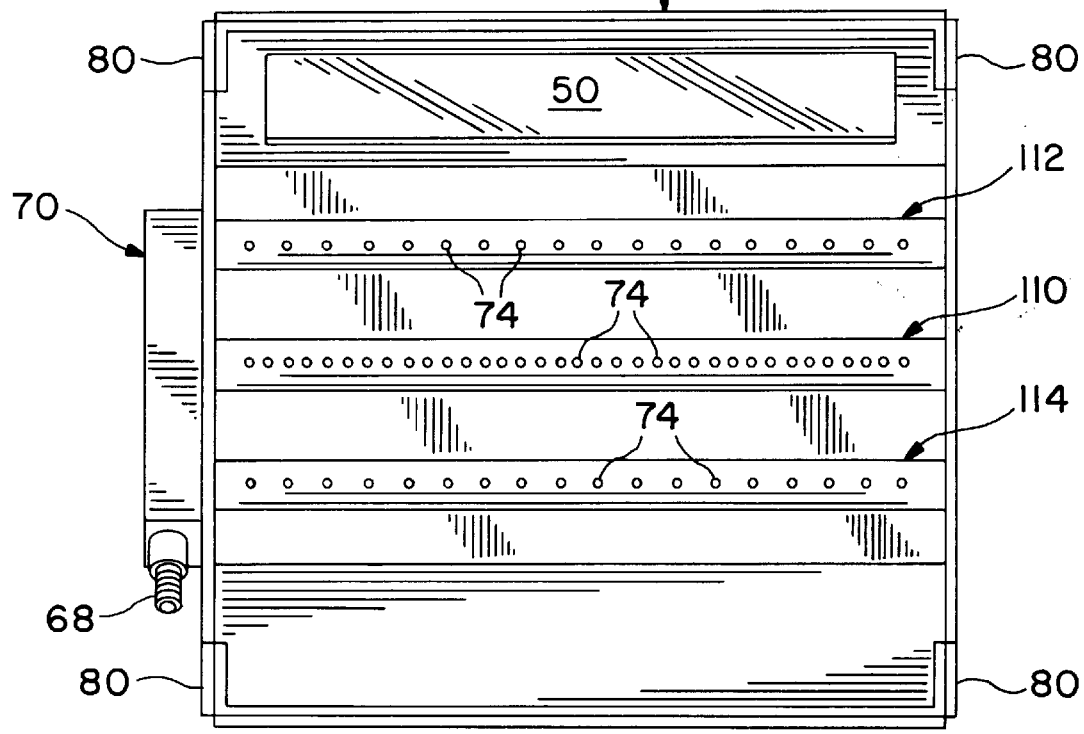
FIG. 6 is a bottom view of the spray manifold of the straight-pipe embodiment of the heat exchange cooling jacket.
Figure 4:
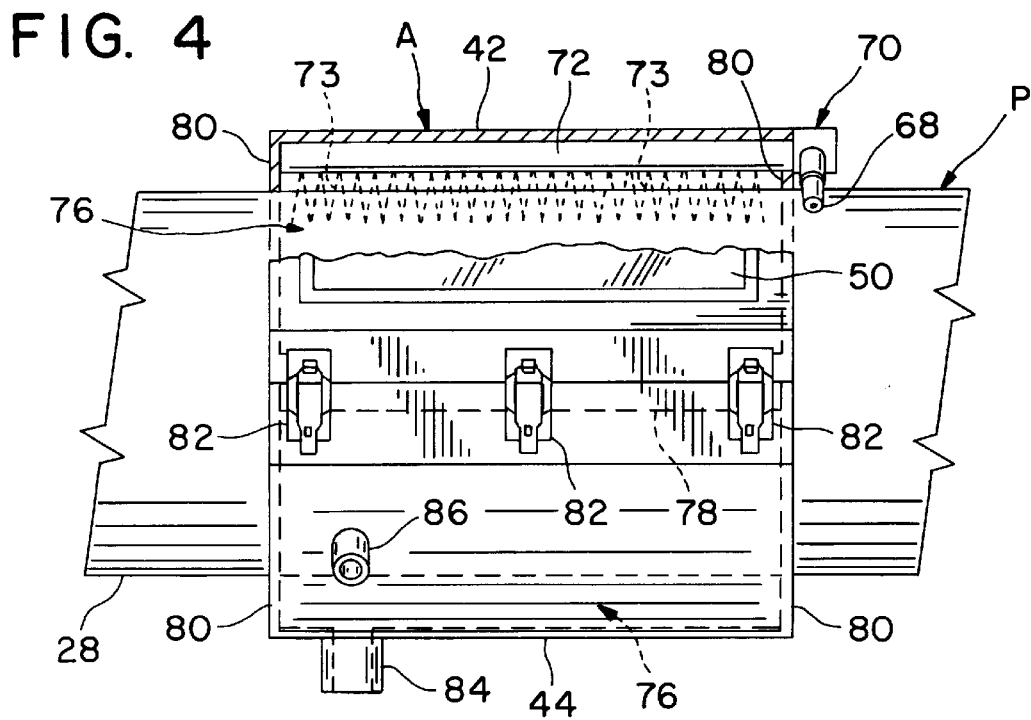
FIG. 4 is a fragmented side elevational view of the straight-pipe embodiment of the heat exchange cooling jacket with portions shown in cross-section and in phantom lines.

FIGS. 2, 4 and 6

FIG. 2 illustrates a three-dimensional view of heat exchange cooling jacket A placed around system piping P with phantom lines to distinguish overlapping portions. FIG. 4 depicts a fragmented side view of cooling jacket A with upper member 42 and lower member 44 shown in phantom lines. Cooling jacket A, the embodiment for the straight portion 28 of system piping P, consists of an upper member 42 and lower member 44. The upper member 42 contains an inlet header 68 attached to a manifold 70 of perforated tubes 72. FIG. 6 shows a bottom view of manifold 70 of perforated tubes 72 with holes 74. FIG. 2 shows these tubes 72 in phantom.

Splash guards 78 are lined along the bottom edges of upper portion 42. These splash guards 78 extend longitudinally to seal upper member 42 with lower member 44. Each side of cooling jacket A has flanges 80 (FIG. 4) to seal the upper 42 and lower 44 members to straight portion 28 of system piping P. Clamps 82 are used to secure upper member 42 to lower member 44. Various well known securing means, including bolts (not shown), may be used. In addition, it is contemplated that the inner annular portion of upper member 42 and lower member 44 may be aligned with a seal or gasket.

During operation, coolant (not shown) enters cooling jacket A through header 68 and into the manifold 70 of perforated tubes 72 generating a spray pattern 73. Coolant descends through the perforated tubes 72, typically at a low pressure, like a shower or spray mechanism onto system piping P. The tubes 72 have holes 74 (FIG. 6), which may have different configurations. In one embodiment, as depicted in FIG. 6, the separation between holes in middle tube 110 is approximately half the separation between holes in outer tubes 112 and 114. Other spacing configurations are also contemplated to provide the desired flow performance. A window 50 on upper member 42 is provided to view the spraying of system piping P.

The coolant forms a continuous sheet of film (not shown), which flows by gravity into a chamber 76 (FIG. 4) between system piping P and cooling jacket A. This coolant is injected into cooling jacket A at a low pressure to provide maximum coverage of the system piping P surface and to provide maximum heat transfer. The system does not involve opening the system piping P, therefore minimizing human exposure to radiation. The heated coolant then descends into the lower member 44 and through the drain outlet 84 (FIG. 4) and overflow outlet 86 (FIG. 4) where necessary.

Figure 3:
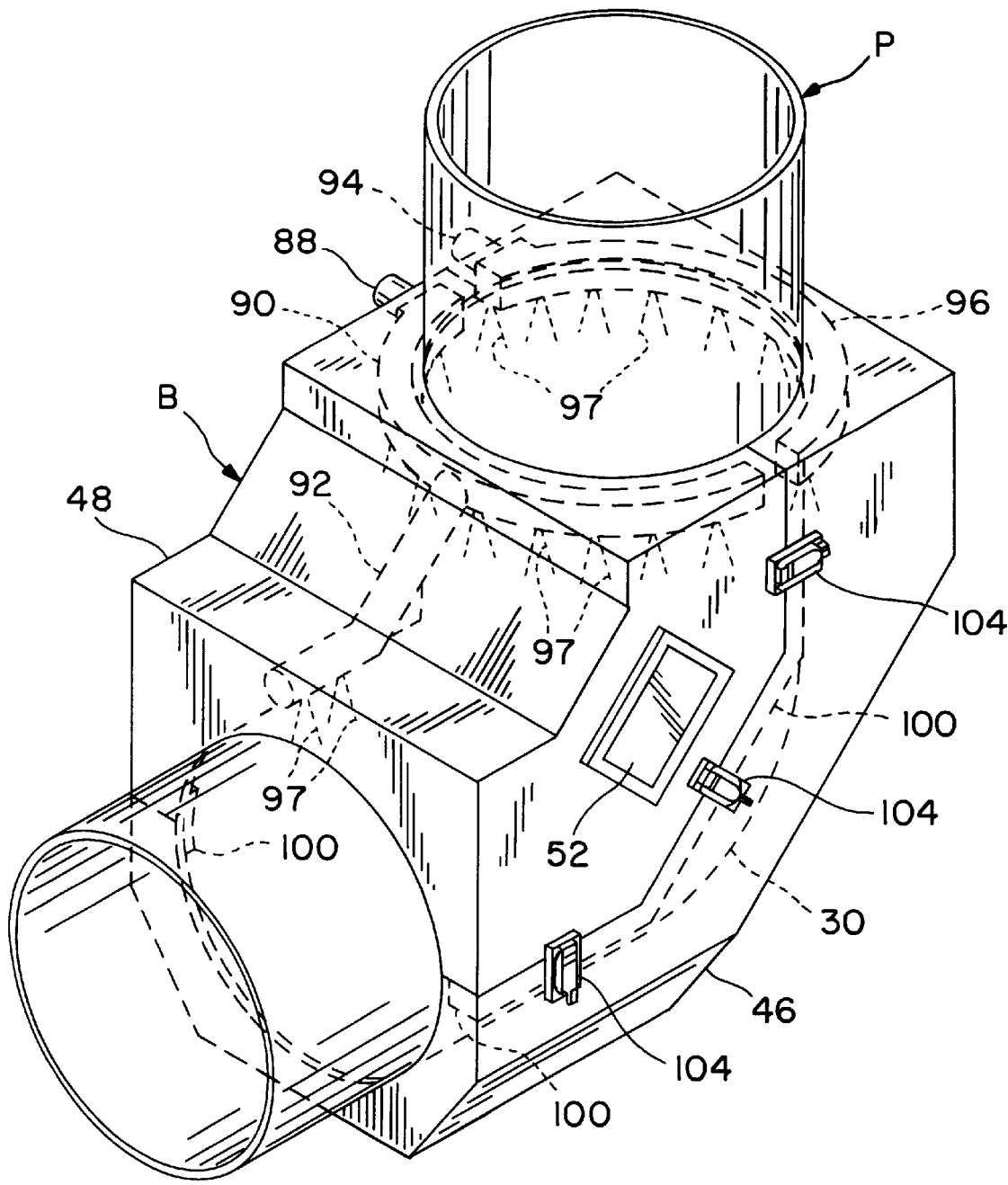
FIG. 3 is a perspective view of the elbow-pipe embodiment of the heat exchange cooling jacket with portions shown in phantom lines.

FIGS. 3 and 5

FIG. 3 illustrates a perspective view of heat exchange cooling jacket B placed around pipe P with overlapping elements shown in phantom. FIG. 5 depicts a fragmented side view of cooling jacket B with upper 48 and lower 46 members shown in phantom.

Cooling jacket B, the embodiment for the elbow portion 30 of system piping P, consists of an upper member 48 and lower member 46. The upper member 48 contains an inlet header 88 attached to a semi-circular perforated tube 90, which is also connected to a bent perforated tube 92. Similarly, lower member 46 contains an inlet header 94 attached to a semi-circular perforated tube 96. The two semi-circular perforated tubes 90 and 96 form a ring header. Tubes 90, 92 and 96 are all shown in phantom in FIG. 3.

Splash guards 100 are lined along the bottom edges of upper member 48. These splash guards 100 extend longitudinally to seal upper member 48 with lower member 46. Each end of cooling jacket B has flanges 102 (FIG. 5) to secure the upper 48 and lower 46 members to the curved (elbow shaped) portion 30 system piping P. Clamps 104 are used to secure upper member 48 to lower member 46. As with the other embodiment, cooling jacket B may have other securing means or include a seal or gasket along the interior of upper member 48 and lower member 46.

The operation of cooling jackets A and B is substantially similar. Coolant (not shown) enters cooling jacket B through headers 88 and 94 and into the ring header consisting of perforated tube portions 90 and 96. Coolant descends through the perforated tubes 90 and 96, as well as through perforated tube 92, at a low pressure generating a spray pattern 97 onto system piping P. A window 52 is located on upper member 48 and a window 54 (FIG. 5) is on the backside of lower member 46 to view spraying of system piping P.

In this embodiment, the coolant also forms a continuous sheet of film (not shown), which flows by gravity into a chamber 98 (FIG. 5) between system piping P and cooling jacket B. This coolant is injected into cooling jacket B at a low pressure to provide maximum coverage of the system piping P surface and to provide maximum heat transfer. The heated coolant then descends into the lower member 46 and through the drain outlet 106 (FIG. 5) and overflow outlet 108 (FIG. 5) where necessary.

While this invention has been described as having a preferred design, it is understood that it is capable of further modification, uses and/or adaptations following in general the principle of the invention and including such departures from the present disclosure as come within known pertains, and as may be applied to the essential features set forth, and fall within the scope of the invention or the limits of the appended claims.

We claim:

1. A readily replaceable heat exchange cooling jacket for applying fluid to a conduit pipe, comprising:
    a) at least two separable members for positioning said cooling jacket about said conduit pipe;
    b) said cooling jacket including upper and lower portions;
    c) said cooling jacket when positioned about said conduit pipe including means for forming a chamber between said conduit pipe and said cooling jacket;
    d) said upper portion of said cooling jacket including fluid spray means positioned above a major portion of said conduit pipe when said cooling jacket is positioned about said conduit pipe; and
    e) said lower portion including fluid removal means.
2. A heat exchange cooling jacket as in claim 1, wherein:
    a) said cooling jacket includes a window.
3. A heat exchange cooling jacket as in claim 2, wherein:
    a) said window is located on upper portion.
4. A heat exchange cooling jacket as in claim 1, wherein:
    a) said upper portion includes an inlet opening for receiving fluid.
5. A heat exchange cooling jacket as in claim 1, wherein:
    a) said fluid removal means includes at least one exit opening.
6. A heat exchange cooling jacket as in claim 1, wherein:
    a) said fluid spray means includes a manifold.
7. A heat exchange cooling jacket as in claim 6, wherein:
    a) said manifold is connected to said inlet.
8. A heat exchange cooling jacket as in claim 7, wherein:
    a) said manifold includes a plurality of tubes aligned longitudinally along the jacket; and
    b) said tubes including a plurality of holes disposed along a length thereof.
9. A heat exchange cooling jacket as in claim 8, wherein:
    a) said plurality of tubes includes a middle tube and two outer tubes;
    b) said middle tube having said holes separated from each other by a first distance;
    c) said outer tubes having said holes separated from each other by a second distance; and
    d) said first distance is half of said second distance.
10. A heat exchange cooling jacket as in claim 7, wherein:
    a) said manifold includes a perforated spray ring header tube and at least one perforated tube connected to said ring header tube and aligned longitudinally along said pipe.
11. A heat exchange cooling jacket as in claim 1, further comprising:
    a) at least two splash guards placed between said separable members.
12. A heat exchange cooling jacket as in claim 1, further comprising:
    a) securing means for locking said separable members together.
13. A heat exchange cooling jacket as in claim 12, wherein:
    a) said securing means includes a plurality of clamps.
14. A heat exchange cooling jacket as in claim 12, wherein:

a) said securing means includes a hinge positioned longitudinally between said upper member and said lower member.

15. A heat exchange cooling jacket as in claim 1, further comprising:
   a) sealing means across a cross-sectional area of said upper portion and said lower portion.

16. A heat exchange cooling jacket as in claim 1, wherein:
   a) a gasket is attached underneath said upper portion.

17. A heat exchange cooling jacket as in claim 1, wherein:
   a) a gasket is attached above said bottom portion.

18. A method for removing heat from a pipe, comprising:
   a) enclosing a portion of the pipe with a heat exchange cooling jacket as claimed in claim 1 to form a chamber between an outside surface of the pipe and said cooling jacket;
   b) spraying cooling fluid at low pressure from an upper portion of the cooling jacket and allowing the fluid to flow downwardly by gravity along the surface of the pipe toward a bottom portion of the chamber;
   c) draining the fluid into a tank operably connected to an output of the cooling jacket;
   d) pumping the fluid into a heat exchanger to cool the cooling fluid; and
   e) recirculating the cooling fluid through the cooling jacket.

19. A system for removing decay heat from a pipe, comprising:
   a) a heat exchange cooling jacket for cooling said pipe;
   b) said cooling jacket having at least two separable members for positioning said cooling jacket about said pipe;
   c) said cooling jacket including upper and lower portions;
   d) said cooling jacket when positioned about said conduit pipe including means for forming a chamber between said conduit pipe and said cooling jacket;
   e) said upper portion of said cooling jacket including fluid spray means positioned above a major portion of said conduit pipe when said cooling jacket is positioned about said conduit pipe;
   f) said lower portion acting as a sump for said upper portion;
   g) a drain tank for receiving fluid from said lower portion;
   h) a heat exchanger for cooling the fluid from said drain tank;
   i) a pump for moving fluid from said drain tank to said heat exchanger; and
   j) said pump for controlling the fluid flow.

20. A system for removing decay heat from a pipe as in claim 19, further comprising:
   a) an overflow tank for receiving excess fluid from said cooling jacket.

21. A system for removing heat from a remote heat source in liquid contact with a horizontal pipe section, comprising:
   a) a cooling jacket for being disposed around the horizontal pipe section, said cooling jacket being adapted to remove heat from the pipe section;
   b) a heat exchanger operably connected to an input of said cooling jacket, said heat exchanger being adapted to remove heat from said cooling jacket;
   c) a drain tank operably connected to an output of said cooling jacket; and
   d) a pump operably connected to said cooling jacket, said heat exchanger and said drain tank to circulate cooling liquid through said cooling jacket, said heat exchanger and said drain tank, such that convection currents are set up within the pipe to transfer heat from the heat source to the cooling jacket.

22. A system for removing heat from a remote heat source in liquid contact with a horizontal pipe section, comprising:
   a) a cooling jacket for being disposed around the horizontal pipe section, said cooling jacket being adapted to remove heat from the pipe section with a cooling liquid, thereby cooling the liquid within the pipe section;
   b) a heat exchanger operably connected to an input of said cooling jacket, said heat exchanger being adapted to remove heat from the cooling liquid;
   c) a drain tank operably connected to an output of said cooling jacket; and
   d) a pump operably connected to said cooling jacket, heat exchanger and drain tank to circulate the cooling liquid through said cooling jacket, heat exchanger and drain tank;
   e) whereby convection currents are set up in the liquid within the pipe section, causing heat transfer from the heat source to the cooling liquid through the cooling jacket.

* * * * *